US010670452B2

(12) United States Patent
Leroux et al.

(10) Patent No.: US 10,670,452 B2
(45) Date of Patent: Jun. 2, 2020

(54) METHOD AND DEVICE FOR DETERMINING THE VIBRATION OF ROTOR BLADES

(71) Applicant: Safran Aircraft Engines, Paris (FR)

(72) Inventors: Andre Pierre Jean Xavier Leroux, Moissy-Cramayel (FR); Romain Charles Gilles Bossart, Moissy-Cramayel (FR)

(73) Assignee: Safran Aircraft Engines, Paris (FR)

( * ) Notice: Subject to any disclaimer, the term of this patent is extended or adjusted under 35 U.S.C. 154(b) by 201 days.

(21) Appl. No.: 15/580,998

(22) PCT Filed: Jun. 9, 2016

(86) PCT No.: PCT/FR2016/051387
§ 371 (c)(1),
(2) Date: Dec. 8, 2017

(87) PCT Pub. No.: WO2016/198794
PCT Pub. Date: Dec. 15, 2016

(65) Prior Publication Data
US 2018/0164150 A1    Jun. 14, 2018

(30) Foreign Application Priority Data
Jun. 9, 2015   (FR) ...................... 15 55262

(51) Int. Cl.
*G01H 1/00*    (2006.01)
*G01B 7/04*    (2006.01)

(52) U.S. Cl.
CPC ............ *G01H 1/006* (2013.01); *G01B 7/044* (2013.01)

(58) Field of Classification Search
CPC ................................ G01H 1/006; G01B 7/044
(Continued)

(56) References Cited

U.S. PATENT DOCUMENTS

2006/0122798 A1    6/2006 Teolis et al.
2006/0239813 A1*  10/2006 Shah ...................... F01D 11/08
                                                                    415/119

(Continued)

OTHER PUBLICATIONS

Michael Zielinski, et al., "Noncontact Blade Vibration Measurement System for Aero Engine Application" 17$^{th}$ International Symposium on Airbreathing Engines, ISABE-2005-1220, XP007904862, Jan. 2005, 9 pages.

(Continued)

*Primary Examiner* — Ricky Ngon
(74) *Attorney, Agent, or Firm* — Oblon, McClelland, Maier & Neustadt, L.L.P.

(57) ABSTRACT

A method for determining the vibration of turbomachine rotor blades, including steps of measuring, via one or more sensors, the variation in the minimum distance between each sensor and the top of each blade along a radial axis of the rotor, between successive rotations of each blade in front of each sensor, a minimum distance value being obtained on each passage of each blade in front of each sensor, in order to deduce therefrom a variation in the lengths of the blades along the radial axis; and, using directly, as such, the variation in the length of the blades along the radial axis in a model of the deformation of the blades, in order to deduce therefrom characteristics of one or more vibrational modes of the rotating blades. A turbomachine can be equipped with a device implementing this method.

6 Claims, 4 Drawing Sheets

(58) Field of Classification Search
USPC .......................................................... 702/56
See application file for complete search history.

(56) References Cited

U.S. PATENT DOCUMENTS

| | | | |
|---|---|---|---|
| 2008/0149049 A1 | 6/2008 | Mollmann et al. | |
| 2008/0177485 A1* | 7/2008 | Cohen ................... | F01D 21/003 702/56 |
| 2010/0089166 A1* | 4/2010 | Zielinski ................ | G01H 1/006 73/660 |
| 2011/0098948 A1* | 4/2011 | Platt ....................... | G01H 1/006 702/56 |
| 2013/0082833 A1* | 4/2013 | Bhattacharya ......... | G01H 1/003 340/517 |
| 2013/0311130 A1* | 11/2013 | Horton ................... | F01D 17/02 702/142 |
| 2014/0007591 A1* | 1/2014 | Khibnik .................. | F02C 7/00 60/805 |
| 2014/0114587 A1* | 4/2014 | Czerniak ............. | G01M 13/028 702/34 |
| 2014/0142888 A1* | 5/2014 | Duncan ................ | F03D 7/0296 702/150 |

OTHER PUBLICATIONS

International Search Report dated Oct. 7, 2016 in PCT/FR2016/051387.

\* cited by examiner

METHOD AND DEVICE FOR DETERMINING THE VIBRATION OF ROTOR BLADES

FIELD OF THE INVENTION

The invention relates to a method for determining the deformation of turbine engine rotor blades to determine the vibratory modes of the blades, and a device for executing this method, disposed in the fixed referential, such as for example the casing.

PRESENTATION OF THE PRIOR ART

In conventional terms, an aircraft turbine engine comprises rotors comprising a plurality of radial blades for accelerating an airflow from upstream to downstream in the body of the turbine engine. The performance of a blade depends mainly on the shape of the blade when the latter is driven in rotation with the rotor on which it is mounted.

Figure 1A:
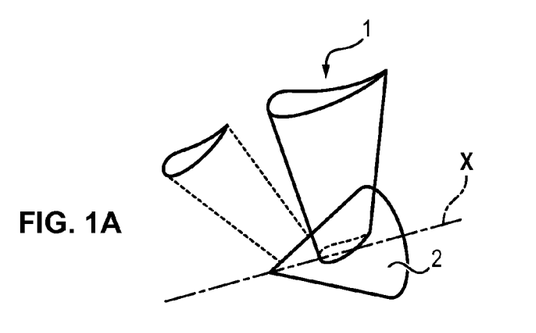
FIG. 1A is a representation of a rotor blade in rotation.
Figure 1B:
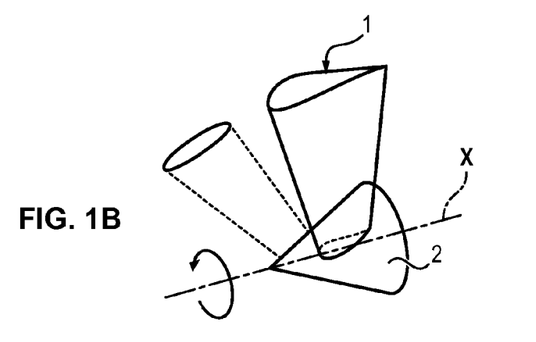
FIG. 1B is a representation of an example of deformation of a rotor blade in rotation.

In reference to FIG. 1A, a blade 1 is mounted on a shaft 2 of a turbine engine extending along a longitudinal axis X. The blade 1 traditionally has a three-dimensional shape which is modified as a function of the speed of rotation of the shaft 2 of the turbine engine. By way of example, in reference to FIG. 1B, the blade 1 may elongate radially and/or twist when the speed of rotation of the turbine engine shaft 2 increases.

In the prior art, it is known to use one or more position sensors to measure the passing time of the tip of the blade at the sensors. This passing time depends on the shape of the head of the blade in rotation. This measured passing time is compared to a theoretical passing time to deduce therefrom the vibratory modes of the blade in rotation, by way of a deformation model.

This method for measuring deformation of the blade is known to the skilled person as "Blade Tip-Timing", or "Tip-Timing", or "Non-Intrusive Stress Measurement (System) (NSMS)", or "Arrival Time Analysis ATA)", or "Blade Vibration Monitoring (BVM)", or "Blade Health Monitoring (BHM)".

Different types of sensors may be used in this process: optical probes, capacitive sensors, Foucault current sensors, pressure sensors, etc.

Optical probes have the advantage of supplying a steep front signal enabling a high precision of the timing. The capacitive, magnetic or inductive sensor delivers a more progressive signal since detection starts earlier and lasts longer, in comparison with the optical probe. The dating of the passage of the blade is therefore less precise.

By comparison, these latter sensors are robust relative to fouling, which is a weak point of the optical probe.

The solutions of the prior art are therefore limited by either sensitivity to fouling, or by measuring precision.

Various solutions for "Tip-Timing" have been proposed in the prior art.

The document *"Noncontact Blade Vibration Measurement System for Aero Engine Application"*, by Zielinski et al., discloses the use of capacitive sensors for determining blade vibrations of a rotor.

In this document (p. 4), the passing time of each blade in front of each sensor (six sensors in total) is measured.

Then the evolution of the passing time of the blades between pairs of sensors is traced as a function of the rotor speed. This passing time varies during resonance of the blades.

Comparing the time curves obtained with known theoretical time curves corresponding to deformation modes expected of the blades provides characterization of the vibration modes.

The solution proposed in this document is therefore a solution of "Tip-Timing" well known in the prior art, and based on measuring and studying passing time, as above. It has especially the drawback of needing powerful fast computers capable of processing a substantial quantity of information, but these computers are heavy and bulky.

The document US 2006/0122798 discloses a solution based on the use of sensors using the passage of a Foucault current. As is evident in FIG. 5 and FIG. 8b, the signature produced by the blade on this type of sensor is particular, since the sensor produces a signal during a long time.

As indicated in paragraph of the document US 2006/0122798, the entire signal is considered for determining the status of the blades.

Consequently, this solution needs considerable processing and calculating means.

Another problem of "Tip-Timing" processes especially is that this process determines the time evolution of the rotor relative to itself, so it is not possible to detect the variations and vibrations of the blades when they move at the same time in a concerted movement.

It is therefore preferable to have a process which eliminates these drawbacks and determines the vibratory behavior of the blades while reducing the number, size, cost and complexity of the processing means necessary for such determination.

PRESENTATION OF THE INVENTION

To eliminate the drawbacks of the prior art, the invention proposes a method for determining the vibration of turbine engine rotor blades, characterized in that it comprises the steps of measuring, via one or more sensors, evolution of the minimum distance between each sensor and the tip of each blade along a radial axis of the rotor, between successive rotations of each blade in front of each sensor, a minimum distance value being obtained with each passing of each blade in front of each sensor, to deduce therefrom a variation in length of the blades along said radial axis, and directly using as such said variation in length of the blades along said radial axis in modelling of the deformation of the blades, to deduce therefrom characteristics of one or more vibratory modes of the blades in rotation.

The invention is advantageously completed by the following features, taken singly or in any of their technically possible combinations:

the variation in length of the blades along said radial axis is calculated by comparing the measurement of the minimum distance between the sensor and the tip of each blade, with a reference distance for which the blade undergoes no vibrations;

the method comprises the steps of:
  measuring, by at least one sensor, a variation of the passing time of the tip of the blades at said sensor, also using this measurement to deduced characteristics of one or more vibratory modes of the blades in rotation;

the method comprises the step of using only the variation in length of the blades along said radial axis in modelling of the deformation of the blades, to deduce therefrom characteristics of one or more vibratory modes of the blades in rotation;

the method comprises the step of deducing the amplitude and/or the phase and/or the frequency of the vibratory modes of the blades in rotation;

the method comprises the steps of
measuring, by at least one sensor, displacement of the blades along a longitudinal axis of the rotor,
also using this measurement to deduce characteristics of one or more vibratory modes of the blades in rotation.

The invention also relates to a device for determining the vibration of the turbine engine rotor blades, characterized in that it comprises:

one or more sensors, each sensor being configured to measure the evolution of the minimum distance which separates it from the tip of each blade along a radial axis of the rotor, between successive rotations of each blade in front of each sensor, a minimum distance value being obtained with each passing of each blade in front of each sensor; and a processing unit, comprising a memory storing modelling of the deformation of the blades, and being configured for
determining a variation in length of the blades along said radial axis from said minimum distance measurements of the sensor, and
directly using as such said variation in length of the blades along said radial axis in modelling of the deformation of the blades, to deduce therefrom characteristics of one or more vibratory modes of the blades in rotation.

This device is advantageously completed by the following features, taken singly or in any of their technically possible combinations:

the sensor is a sensor capable of measuring a distance at the blade tip, such as a capacitive sensor;

the device comprises at least one sensor, configured to measure passing time of the tip of the blades at said sensor, the processing unit being configured to deduce characteristics of one or more vibratory modes of the blades in rotation from measurement of the minimum distance between the sensor and the tip of the blades along a radial axis of the rotor, measurement of the passing time of the tip of the blades and modelling of the deformation of the blades.

The invention also relates to a turbine engine comprising a rotor with a plurality of blades, and a device for determining the vibration of turbine engine rotor blades, such as described previously.

The invention has many advantages.

The invention exploits information associated to deformation of the radial length at the tip of the blade to deduce the vibratory modes of the blades, which increases both the robustness and precision of measuring and of the calculating of the vibration. Measuring passing time of the tip of the blades vertically above the sensors is therefore no longer needed.

The invention detects the vibrations of the blades even if all the blades exhibit the same displacement at the same time.

Finally, the invention combines several measurements, such as variation in radial deformation of the blade with the variation of the passing time of the tip of the blade and/or the axial displacement of the blade, to refine determination of the vibratory modes of the blades in rotation.

PRESENTATION OF THE FIGURES

Other features and advantages of the invention will emerge from the following description, which is purely illustrative and non-limiting, and must be considered in conjunction with the appended drawings, in which.

DETAILED DESCRIPTION

Device

Figure 2:
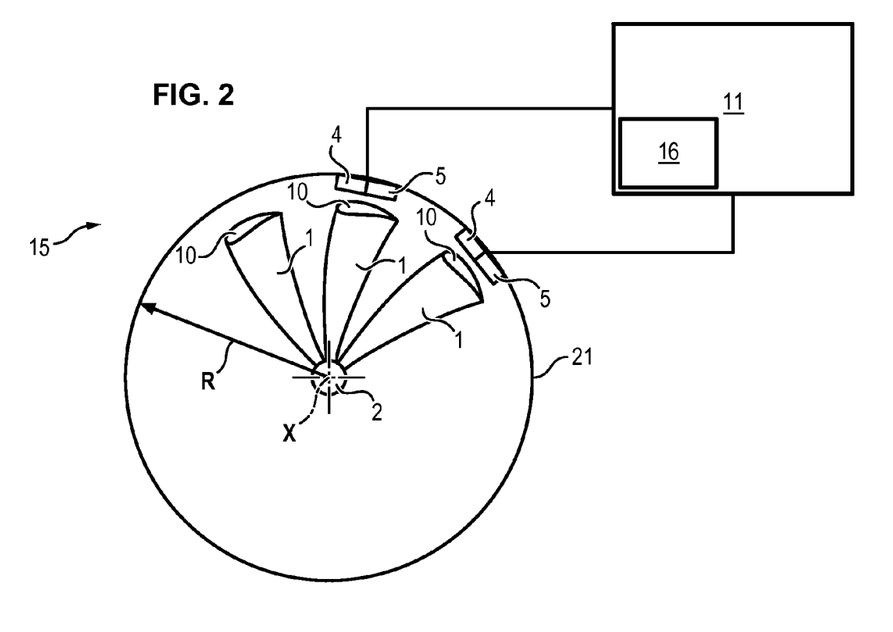
FIG. 2 is a schematic representation of a possible embodiment of a device for determining the vibration of turbine engine rotor blades, according to the invention.

FIG. 2 illustrates a possible embodiment of a device 15 for determining the vibration of turbine engine rotor blades 1. This illustration is schematic.

Each blade 1 is mounted on a shaft 2 and is movable in rotation around a longitudinal axis X of the rotor. This longitudinal axis coincides in general with the longitudinal axis of the turbine engine.

The device 15 comprises at least one sensor 4, configured to measure the distance between the sensor 4 and the tip 10 of the blades 1, along a radial axis R of the rotor.

The radial axis R is the axis along which the blades 1 extend around the shaft on which they are mounted in rotation.

In general, a plurality of sensors 4 is provided. The sensor 4 is a distance or position sensor.

This distance is likely to vary as a function of vibrations undergone by the blade (dynamic deformations), and as a function of static deformation of the blade, which results especially from centrifugal force and aerodynamic load. The sensor(s) 4 register the variation in this distance over time. In particular, evolution of the minimum distance between the sensor 4 and the tip of each blade 1 along the radial axis R is measured between successive rotations of each blade in front of each sensor 4.

In fact, each blade describes a plurality of successive rotations. Each time each blade passes in front of each sensor, a minimum distance value is measured by each sensor 4. The sensor 4 may especially be programmed to measure this minimum distance with each passing of the blade in front of said sensor 4.

As explained hereinbelow, this single evolution value of minimum distance, as single item of information, is enough to supply an algorithm for determining vibration modes without wanting to transform or method them to determine passing time.

The minimum distance measurement of the sensor 4 deduces a variation in length of the blades 1 along said radial axis R.

In particular, comparison of the evolution of the minimum distance measured by the sensor 4 with a reference distance deduces evolution of the deformation of the length of the blade 1 along the radial axis R. The reference distance is for example the distance for which the blade undergoes no vibration.

Alternatively, or in addition, the reference distance may be determined by another process, such as the average of a certain number of preceding measurements representative of the rotor in the absence of vibrations.

The sensor 4 is for example a capacitive sensor. It may also be other sensors, such as an optical probe, a laser rangefinder, or a Foucault current sensor, etc.

In the example shown in FIG. 2, the blades 1 are enclosed by a casing 21. The sensors 4 are disposed on the inner face of the casing 21 and are turned towards the tips 10 of the blades 1.

In the case of an unshrouded rotor, it is for example possible to provide a support mast of the sensors 4 to dispose the latter near the tips 10 of the blades 1. Other positioning of the sensors 4 are possible according to the environment of the rotor. The sensors 4 are positioned in a fixed referential of the turbine engine.

The device 15 further comprises a processing unit 11. The processing unit 11 is of processor type, comprising at least one memory 16, and capable of executing a computer program for processing measurements from the sensors 4.

The unit 11 may communicate with the sensors 4 to collect measurements. This communication is performed by any known means, such as for example by wire, or wireless, or radio connection or by removable storage means.

The memory 16 stores modelling of the deformation of the blade 1. This modelling is extracted from a 3D model of the blade, which considers the different parameters of the blade (dimensions, mechanical properties, external environment, etc.).

As explained hereinbelow, the processing unit 11 is configured to determine characteristics of one or more vibratory modes of the blade 1 in rotation, especially from measurement of minimum distance of the sensor 4, which come back to variation in length of the blades along the radial axis R, and the deformation model of the blade 1. This also includes static deformation of the blade, which may be seen as a zero-frequency vibratory mode.

Optionally, the device 15 comprises at least one sensor 5, configured to measure a passing time of the tip 10 of the blades 1 at said sensor 5. The sensor 5 is a presence detection sensor, or a position and/or distance sensor.

When the blade undergoes deformation, the passing time vertically above the sensor 5 varies. In particular, this measured passing time is correlated directly with the deformation amplitude of the blade.

Therefore, when the processing unit 11 compares this measured passing time to theoretical passing time, the processing unit 11 deduces deflection of the blade (given the displacement speed of the blade in front of the sensor, this displacement speed depending on the speed of rotation), and consequently characteristics of the vibratory modes of the blades 1, by way of modelling of the deformation.

The sensor 5 is for example a capacitive sensor. It may also be other sensors such as an optical probe, or a Foucault current sensor, or a pressure sensor, etc.

The sensor 5 may have the same positioning as the sensor 4, as explained earlier.

In general, a plurality of sensors 5 is provided, for example between four and eight sensors.

The same sensor may be used for sensor 5 and sensor 4. In the case of a capacitive sensor, at the same time this provides the passing time of the tip 10 of the blade 1 and the minimum distance which separates it from the tip of the blade with each passing of the blade (and consequently the variation in length of the blade along the radial axis).

Alternatively, the sensor 4 and the sensor 5 may constitute separate sensors, for example disposed side by side.

In an embodiment, the processing unit 11 is configured to determine characteristics of one or more vibratory modes of the blades 1 in rotation from evolution of the minimum distance between the sensor 4 and the tip 10 of the blades 1 along a radial axis R of the rotor (this measurement produces measurement in variation in length of the blades 1 along the radial axis), measurement of the passing time of the tip 10 of the blade 1 (obtained by the sensor 5), and modelling of the deformation of the blades 1.

Accordingly, the processing unit 11 exploits both measurements from the sensor 4 and measurements from the sensor 5 for calculating the vibratory modes of the blade 1.

Alternatively, in an embodiment, the processing unit is configured to use only a distance measurement (especially the measurement of minimum distance of the sensor 4) in the modelling of the deformation of the blades. As indicated, the processing unit calculates a variation in length of the blades 1 along the radial axis R from measurements of distance of the sensor 4. This variation in length of the blades along the radial axis is used directly as such in modelling of the deformation of the blades to deduce therefrom characteristics of one or more vibratory modes of the blades 1 in rotation.

This embodiment therefore dispenses with measurements of the passing time of the blades to determine the vibration modes of the blades.

Method

A method will now be described for determining the vibration of turbine engine rotor blades 1 executing the above device 15.

The method is performed during operation of the rotor to evaluate the characteristics of deformations of the blades 1.

The method (cf. FIG. 4) comprises a step E1 of measuring the evolution of the minimum distance between the sensor 4 and the tip 10 of the blades 1 along the radial axis R of the rotor. This evolution is studied from minimum distance measurements between each sensor and each blade, between different successive passages of the blade.

It is therefore a case of seeing how the minimum distance for each blade (blades 1 to N) evolves during the different passages in front of the sensor (or respectively in front of the sensors 1 to X).

Figure 3:
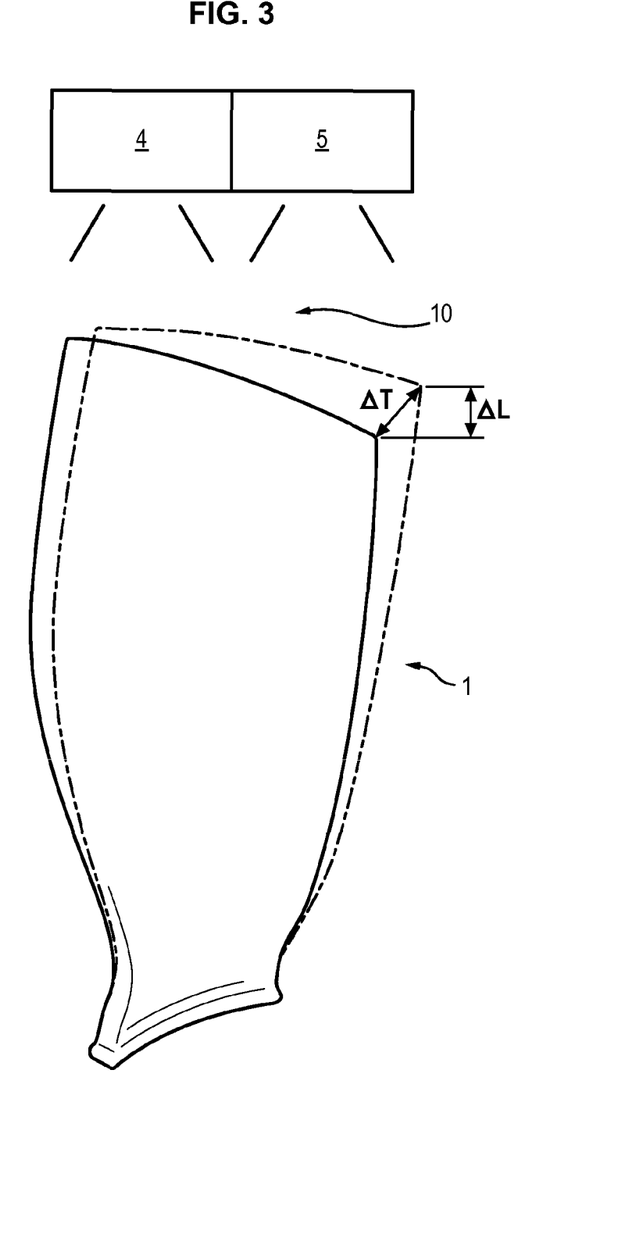
FIG. 3 is a schematic representation of the deformation of a blade, the measurement of the variation in radial length of the blade and measurement of the variation of the passing time of the tip of the blade.

As stated earlier, this measurement produces the time variation in the length of the blades 1 along the radial axis of the rotor. This variation in length ΔL along the radial axis is shown in FIG. 3.

This measurement is made with each passing of the blade 1 vertically above the sensor 4.

Figure 4:
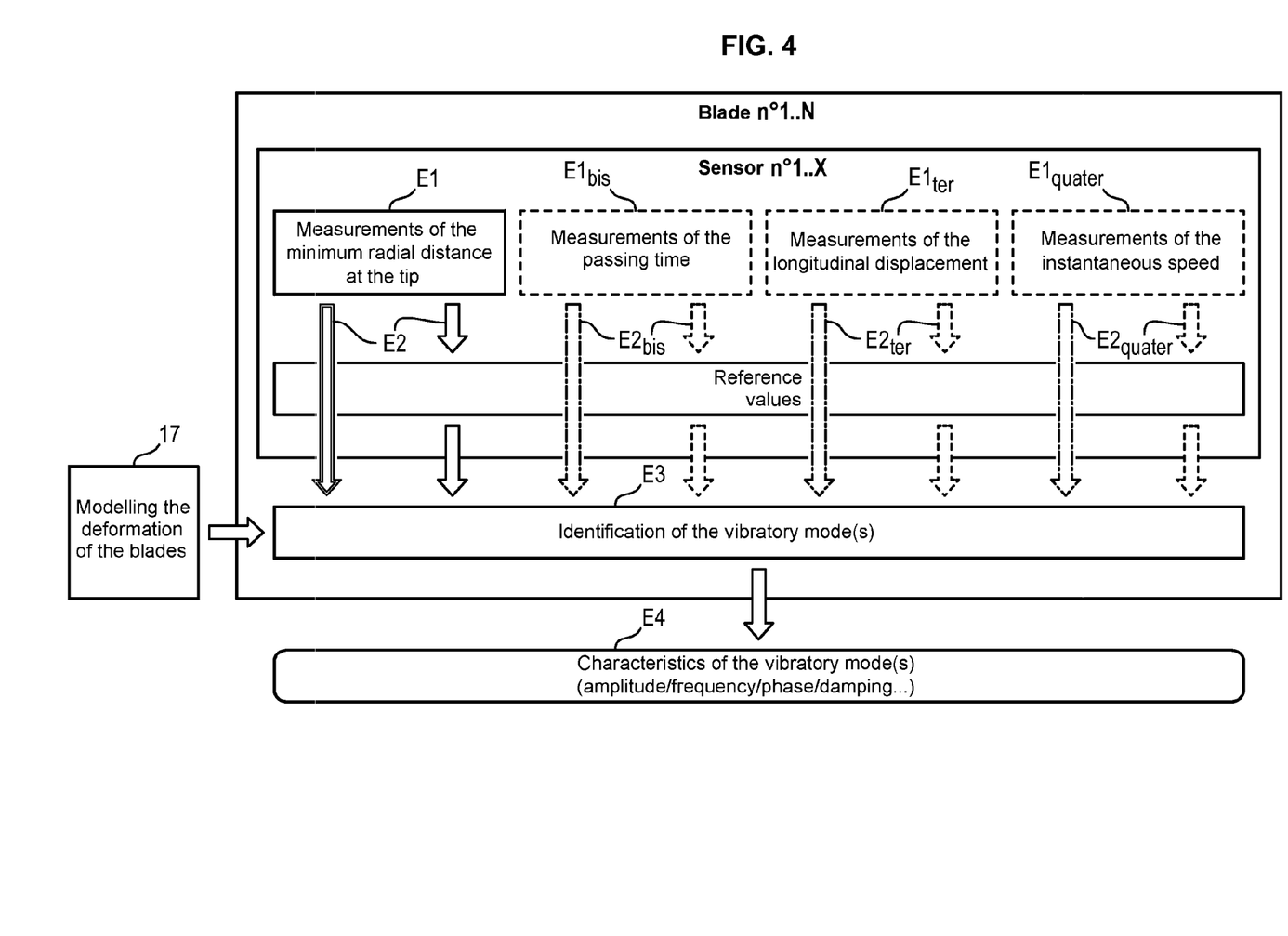
FIG. 4 is a schematic representation of a possible embodiment (in single full lines) of a method for determining the vibration of rotor blades according to the invention, and possibilities of variants, featuring different traits.

The processing unit 11 (step E2) compares the minimum distance measured by the sensor 4 with each passing to a reference distance.

The reference distance may especially be the theoretical distance for which the blade undergoes no vibration, and/or may be calculated from the average of preceding measurements. The theoretical distance is known since the dimensions of the blade 1 are known from manufacture, as are the positioning of the blade 1 in the rotor and the position of the sensor 4 relative to the blade 1.

Figure 5:
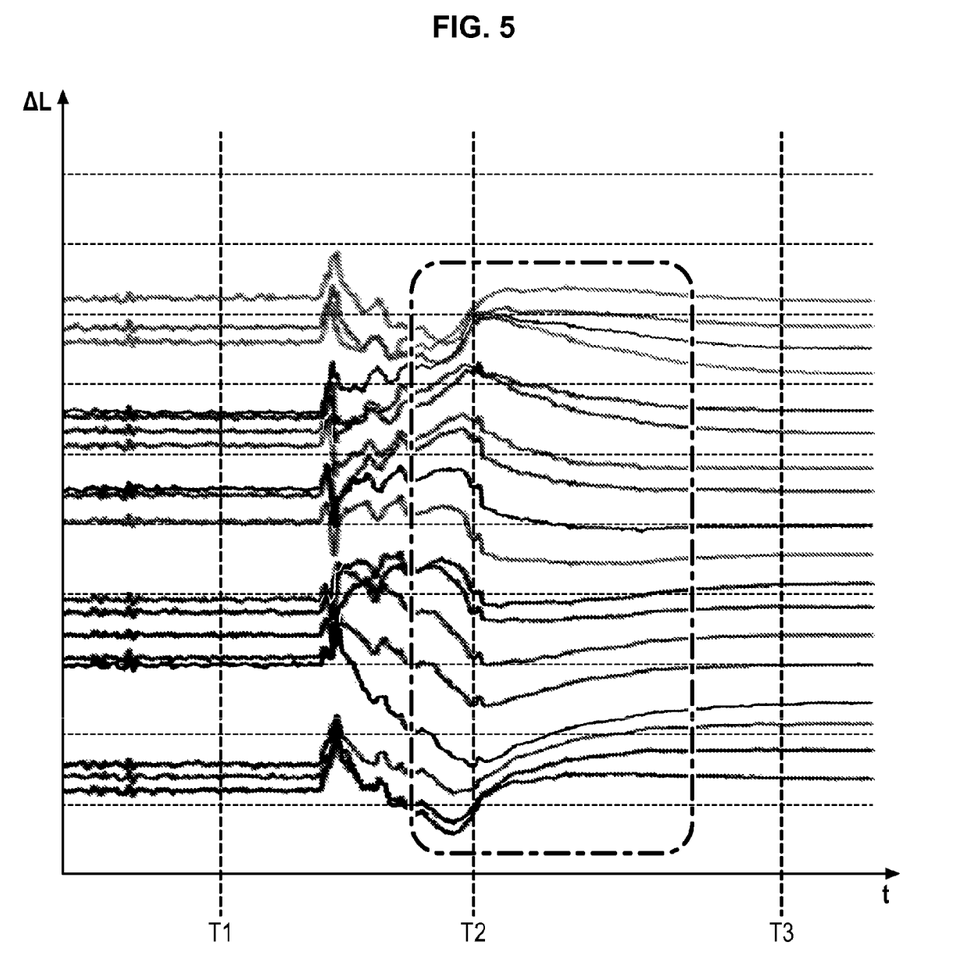
FIG. 5 is a schematic representation of the variation in length of blades along the radial axis as a function of time, each curve corresponding to a blade, for a single sensor.

Alternatively, the reference distance may be (cf. arrow E2 in double lines in FIG. 4), for continuous acceleration or deceleration of the blade, the distance measured immediately before and/or immediately after the crossover of the vibratory mode at the preferred speed (this time is embodied by T1, respectively T3, in FIG. 5). This method is called zero method. It dispenses with other excesses of the radial length of the blade, which are not due to the preferred phenomenon (for example, heating of the engine, or deformation of the engine, not characteristics of the preferred vibration). For this reason, it is assumed that only the preferred vibration phenomenon which is of interest has rapid evolution, whereas the other variation parameters are of slower evolution.

This comparison produces evolution of the variation in length of the blade 1 along the radial axis, due to the vibrations undergone by the blade 1 in rotation, as a function of time.

As mentioned previously, the processing unit 11 has modelling 17 of the deformation of the blade 1, stored in its memory 16. This modelling 17 is extracted from a 3D model of the blade, which considers the different parameters of the blade (dimensions, mechanical properties, external environment, etc.).

This type of approach is already used in "Tip-Timing".

In this type of modelling, knowledge of local deformations applied to the blade comes back to the vibratory modes of the blade, and therefore to the distribution of stresses undergone by the entire blade.

In practice, local deformation such as measured at the tip is compared to several possible hypotheses of deformation modes of the blade to identify the vibratory mode(s) undergone by the blades (step E3 in FIG. 4).

The processing unit 11 therefore directly introduces as such the measurement in variation in length of the blade 1 along the radial axis, in the deformation model of the blade 1. The unit 11 deduces from this (step E4) the characteristics of one or more vibratory modes of the blades 1. In particular, amplitude, frequency, phase, and damping of the vibratory mode(s) undergone by the blades are calculated.

In an embodiment, during step E3, the processing unit 11 uses only one distance measurement in modelling the deformation of the blades 1 to deduce therefrom characteristics of one or more vibratory modes of the blades 1 in rotation, said distance measurement comprising the distance measurement of said sensor 4 which determines the variation in length of the blades 1 along the radial axis.

In this way, the raw datum of minimum distance with each passing of the blade is used (or more particularly the variation in length of the blades along the radial axis which results from this) in the algorithm which models deformation of the blades, without this distance measurement being converted into passing time.

An example of measurement of the variation in length of the blades 1 as a function of the time is shown in FIG. 5.

Each curve shows the behavior of one of the blades of the rotor as it passes in front of a given sensor. There are as many curves as blades. The position seen by a single sensor 4 is shown on this curve.

The abscissa represents the time or rotation speed of the rotor, the measurement forming ideally during acceleration or deceleration so as to intersect the vibratory modes.

The ordinate represents the value $\Delta L$ of the clearance at the blade tip when the blade passes in front of the sensor. The variation $\Delta L$ in clearance at the blade tip may be assimilated inversely from variation of the radial length of the blade 1, relative to the theoretical length of the blade 1 (length without deformation).

The graphic therefore corresponds to a discontinuous succession of values obtained at each revolution, the values being represented in a continuous curve, for a given blade in front of a given sensor.

On this graphic, the variation $\Delta L$ is represented as a function of time during acceleration, for each blade.

In the presence of a synchronous vibration mode, deformation of each of the blades in front of a sensor presents a pattern characteristic of the resonance of a synchronous mode (time T2 in the part enclosed on the curve).

In particular, the signature characteristic of a synchronous mode is that the deformations at this instant are different from one blade to the other, with certain blades having a maximum deformation, others a minimum, and others an intermediate value. In other words, when the synchronous mode is traversed, the evolution of the deformation is reflected by an advance for certain blades, a delay for other blades and stagnation for a few blades.

The number of minimum and the number of maximum are representative of the vibration harmonic because each blade may have made several vibration return journeys in one revolution. FIG. 5 shows a simple harmonic.

At the instant T3, a new distribution of clearance, different to that of instant T1, is visible, the passage of synchronous resonance having led these changes in distribution of clearance.

In posing hypotheses on the mode(s) of vibration undergone by the blades (for example harmonic 1, or 2, etc.), the processing unit 11 compares the distribution of deformations measured at this instant to the distribution of deformations coming from hypotheses to validate these hypotheses and identify the vibration mode(s).

As is evident, the method implements calculation of vibration directly from a measurement of variation in distance.

Therefore, determining passing time or measuring passing time is no longer absolutely necessary. This is advantageous and increases precision of the calculation. For example, it has been mentioned that the sensor 4 could be a capacitive sensor, which is a sensor resistant to fouling but whereof measuring passing time (process known as "Tip-Timing") of the tip of the blade is less precise than other sensors.

Yet, according to the method, it is above all a radial distance measurement ($\Delta L$) which deduces the vibratory modes of the blade. Given that the capacitive sensors are precise in the distance measurement, the method combines precision of measuring and robustness, which was not the case of the "Tip-Timing" method of the prior art, based on the unique measuring of passing time of the tip of the blade.

Also, via this measuring and its exploitation, the method identifies directly an overall vibratory mode (ON mode) by detecting "inflation" of the blading of the rotor.

In fact, a problem of the "Tip-Timing" process especially is that this process determines the time evolution of the rotor relative to itself, so it is not possible to detect variations and vibrations when all the blades are moving at the same time.

With the device and the method according to the invention, the evident inflation simplifies detection of vibrations.

If all the blades move at the same time, measuring displacement is precise, even if all the blades move in a similar way.

Also, vibrations are determined directly and need no major calculations, differently to the processes of the prior art based on the principle of "Tip-Timing". Due to fewer calculation needs, the power of processing units for precisely determining the modes of vibrations no longer needs to be oversized.

Finally, for a given blade and a given sensor, as many measurements as passages are obtained, which quickly and reactively provides evolution of the radial length of the blade, without the need to create averages of measurement or sinusoidal modelling.

For there to be additional measurements, it is possible to provide one or more measurements for completing radial deformation measuring of the tip of the blade.

Optionally, the method comprises the extra step $E1_{bis}$ of measuring a variation in passing time of the tip 10 of the blades 1 at the sensor 5, relative to theoretical passing time (arrow $E2_{bis}$ in evenly dotted lines). Alternatively, passing time measured may be compared to passing times measured previously (arrow $E2_{bis}$ in irregular broken lines), as explained for measurements of radial distances.

This variation ($\Delta T$) is linked to deformation of the blade along the tangential axis, and no longer radial axis, as previously (see FIG. 3).

The processing unit 11 introduces measuring of the distance between the sensor 4 and the tip 10 of the blades 1 along a radial axis R of the rotor, and the measurement of the variation of the passing time of the tip 10 of the blades 1, in the modelling of deformation of the blades 1, to deduce therefrom the characteristics of the vibratory modes of the blades 1.

The combination of both items of information in the model improve calculation precision. It is noted that both these measurements are, as first approximation, in phase quadrature. As a consequence, measurement and robustness performances are increased.

According to simplified modelling, the blade is comparable to an oscillator whereof amplitude, phase and where appropriate frequency are to be determined.

Measuring the variation in passing time gives additional information on the knowledge of vibration modes of the blades.

Schematically, this modelling in a two-dimensional space or two variables is comparable to discrete processes of trellis coding used in telecommunications (for example, the Viterbi process), where extraction of the transmitted signal is achieved by comparing phase and amplitude of the signal measured to phase and amplitude of a reconstructed clock signal.

The phase and the amplitude are replaced here by the variation in passing time $\Delta T$ and the variation in clearance $\Delta L$ (corresponding to the variation in radial length of the blade). Each vibratory mode has a signature combining passing time and its own specific clearance.

This combination further reduces measuring noises and improves measuring robustness.

To further improve calculation of the characteristics of vibratory modes, it is possible to consider other measurements such as the displacement of the blades along a longitudinal axis (X) of the rotor. A dedicated sensor may be used (position or distance sensor), or a sensor already mentioned (sensor 4/5) may be used for this measurement.

The sensor measures (step $E1_{ter}$) the distance which separates it from the blade according to the longitudinal axis, to deduce therefrom the longitudinal displacement of the blade. Again, a minimum distance value is obtained for each blade each time is passes in front of a sensor, which determines the longitudinal displacement of the blade over time. For example, longitudinal displacement is carried out by following the longitudinal position of the leading edge or the trailing edge.

Again, a value of longitudinal position is obtained for each passage in front of each sensor and longitudinal displacement is deduced over time.

This measurement may be compared to a reference distance, without vibrations, to determine the longitudinal displacement of the blade, similarly to what has been described for determining the variation in radial length of the blade (arrow $E2_{ter}$ in evenly dotted lines). The distance measured may also be compared to an average of distances measured previously (arrow $E2_{ter}$ in irregular broken lines).

In this embodiment, each vibratory mode is characterized by its own signature and combines passing time $\Delta T$, a radial clearance $\Delta L$ (corresponding to the variation in radial length of the blade) and longitudinal displacement. The theoretical deformation model of the blade is therefore applied in space to three variables.

The technologies mentioned for sensors 4 and 5, and their positioning, apply to this sensor.

The instantaneous speed of the blade may also be measured (step $E1_{quater}$) so it may be considered in the model of the blade. The latter may be compared to a reference value, such as a theoretical value (arrow $E2_{quater}$ in evenly dotted lines), or to values measured previously (arrow $E2_{quater}$ in irregular broken lines).

Given that the instantaneous speed of the blade is being considered, the theoretical deformation model of the blade is projected into a representation space which counts as an extra dimension, i.e., the theoretical deformation model of the blade is applied in a space having four variables. The theoretical deformation model of the blade is projected in a representation space having at a minimum a dimension which comprises the variation in length of the blades.

The invention claimed is:

1. A method for determining a vibration of turbine engine rotor blades of a rotor, the method comprising:
   measuring, via one or more sensors,
      evolution of a minimum distance between each sensor and a tip of each blade along a radial axis of the rotor, between successive rotations of each blade in front of each sensor, a minimum distance value being obtained with each passing of each blade in front of each sensor, to deduce therefrom a variation in length of the blades along said radial axis; and
      only and directly using as such said variation in length of the blades along said radial axis in modelling of a deformation of the blades, to deduce therefrom characteristics of one or more vibratory modes of the blades in rotation.

2. The method according to claim 1, wherein the variation in length of the blades along said radial axis is calculated by comparing the measurement of the minimum distance between the sensor and the tip of each blade with a reference distance for which the blade undergoes no vibrations.

3. The method according to claim 1, further comprising deducing an amplitude and/or a phase and/or a frequency of the vibratory modes of the blades in rotation.

4. A device for determining a vibration of turbine engine rotor blades of a rotor, the device comprising:
   one or more sensors, each sensor being configured to measure an evolution of a minimum distance which separates the sensor from a tip of each blade along a radial axis of the rotor, between successive rotations of each blade in front of each sensor, a minimum distance value being obtained with each passing of each blade in front of each sensor; and
   processing circuitry coupled to a memory storing modelling of a deformation of the blades, and configured to:
      determine a variation in length of the blades along said radial axis from said minimum distance measurements of the sensor, and
      only and directly use as such said variation in length of the blades along said radial axis in modelling of the deformation of the blades, to deduce therefrom characteristics of one or more vibratory modes of the blades in rotation.

5. The device according to claim 4, wherein the sensor is a capacitive sensor.

6. A turbine engine comprising:
the rotor comprising a plurality of the blades; and
the device for determining the vibration according to claim 4.

* * * * *